Feb. 23, 1960  H. L. WHEELER, JR  2,925,913
FILTER UNIT
Filed July 30, 1956  2 Sheets-Sheet 2
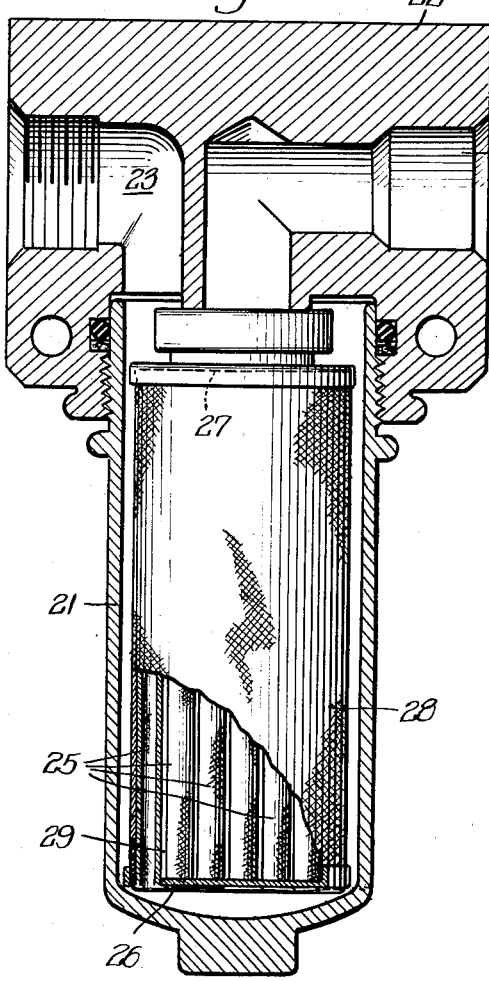
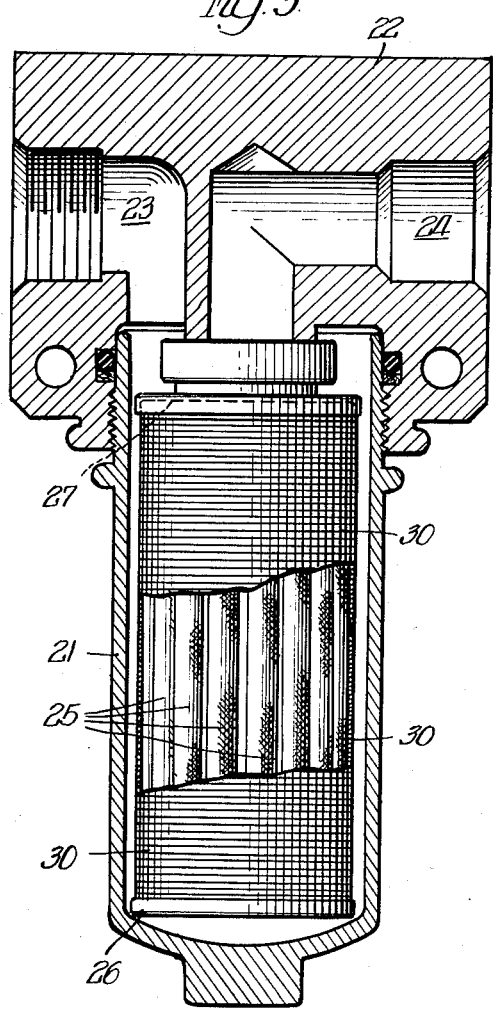
INVENTOR.
Harry L. Wheeler, Jr.,

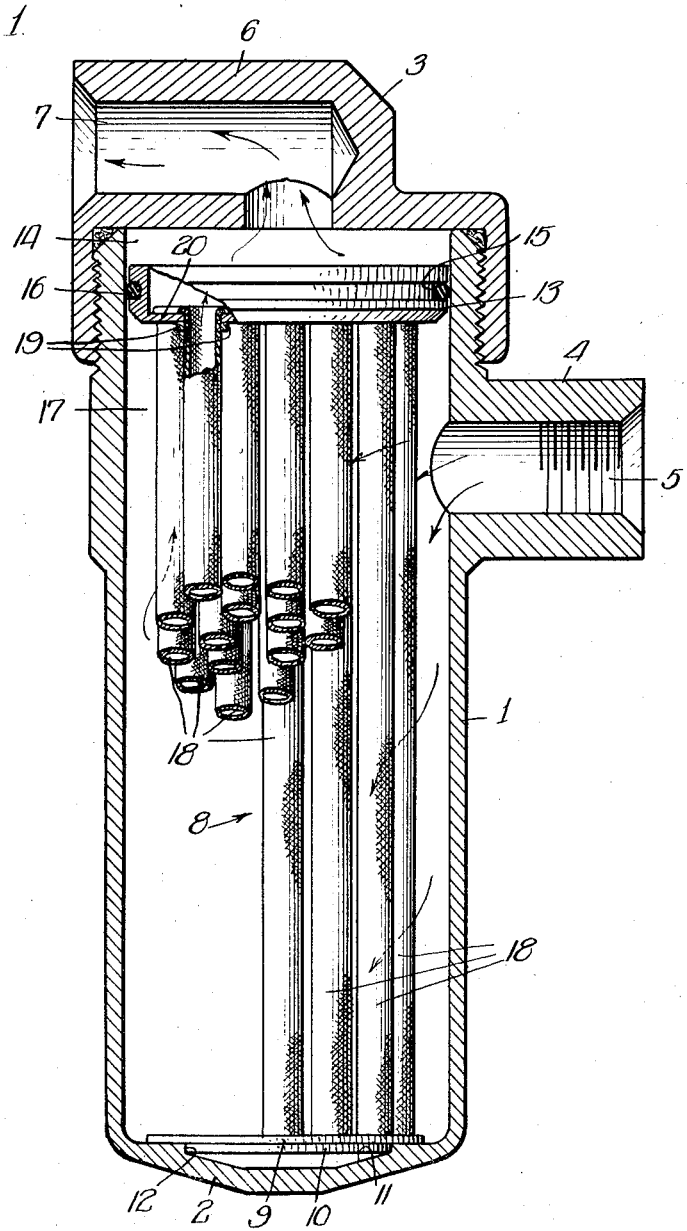

United States Patent Office 2,925,913
Patented Feb. 23, 1960

2,925,913

FILTER UNIT

Harry L. Wheeler, Jr., Van Nuys, Calif., assignor to Poroloy Equipment, Inc., Van Nuys, Calif., a corporation of California Application July 30, 1956, Serial No. 600,996

12 Claims. (Cl. 210—323)

This invention relates to the art of filtration and is more particularly concerned with a structurally and functionally improved filtering unit. Although not limited thereto, the filtering unit of the present invention has especial application in the aircraft and missile field for the filtration of fuels and hydraulic control system oils. It is also employable in the filtration of fluids in atomic reactors, as well as in stationary power installations and in industrial processes, in the latter, for example for the removal of powdered catalysts in the refining industry.

Broadly, it is an object of the present invention to provide a filtering unit wherein the filter material per se doubles as the structural components of the filter. Heretofore, there has not been a satisfactory filter material embodying structural properties. It has always been necessary to wrap sheet type filter materials about supports, such as punched steel or wire cloth, the supports acting as the structural members of the filter, inasmuch as the filter material was incapable of bearing any structural loads. The latter is also true of the procelain type filters where the filter element must be virtually free of any structural load other than that imposed by the pressure drop.

Specifically, the present invention contemplates the provision of a filtering unit of the character described employing a plurality of porous tubes of filtering material arranged between a pair of headers much in the manner of a multi-tube heat exchanger, and in which the filter tubes are characterized by being capable of bearing structural loads. Such tubes of filtering material may be formed, for example, by wrapping a very thin and narrow ribbon of flattened wire around a mandrel of circular cross-section in a manner hereinafter described. This ribbon is composed of a sinterable material, and after being wound on the mandrel to the desired depth, the mandrel and wire as a unit are placed in a controlled atmosphere furnace and sintered. After sintering, the mandrel is removed and the porous metallic tube processed to a finished form. Porosity of the tube is obtained by the spaces between the individual strands of wire. With proper control, the pores or spaces will be interconnected, of predetermined size, uniformly distributed, and will form a predetermined passage for the fluid to flow through the metal of the tube. Such tubes are well fitted to take loads of tension and/or compression.

Another object of the present invention is, therefore, the provision of a filtering unit of the character described employing a metallic sinterable filtering material capable of sustaining the structural loads of tension and compression. For example, in one form of the device, the plurality of tubes are fixed to the lower header. The lower surface of the upper header seats on lateral projections at the upper end of the tubes, and the latter ends of the tubes are spun over the upper surface of the header. Such tubes may be considered to be in compression between the upper and lower headers. In another form of the device, the opposite ends of the tubes are spun over the under surface and over the upper surface of the lower and upper headers, respectively. The headers are spaced apart by a porous annular ring encircling the plurality of filter tubes. Such ring is made in the same manner and of the same material as the filter tubes. In that form of device, the annular ring is in compression while the filter tubes are in tension. In still another form of the device, the annular ring may be replaced by layers of wire cloth to space the headers, thus placing the filter tubes in tension.

Still another object of the invention resides in the provision of a filtering unit wherein the flow of fuel through the filter is in parallel, rather than in series, as heretofore. That is to say, for example, in the form of device employing the annular ring, the filter tubes are open at both ends. The fluid flows into and through the walls of such tubes at the same time as fluid flows through the annular ring, the two flows commingling and passing out the filter outlet to the point of use. This is as distinguished from those devices wherein fluid is passed through a filter and thence passes into a collecting tube from whence it is led to its point of use.

Other features and advantages of the invention will in part be obvious and in part will hereinafter appear and they consist generally in the features of construction, combination of elements, and arrangements of parts, which will be exemplified in the constructions to be described and of which the scope of application will be indicated in the appended claims.

In the accompanying drawings, in which is shown the preferred illustrative embodiments of the invention:

Figure 1 is a vertical sectional view through a filtering unit embodying the principles of the present invention;

Figure 2 is a view similar to Figure 1, but of a modified form of device, and

Figure 3 is a view similar to Figures 1 and 2, but of a further modified form of device.

Referring now in detail to the drawings, the filtering unit of the present invention comprises a casing 1 having a closed bottom 2 and a removable cover 3, the latter being screw threaded upon the open end of the casing. The casing is cylindrical in shape and immediately below the cover 3 is provided with a tube 4 defining an inlet passage 5 into the casing. Cover 3 is also provided with a tube 6 defining an outlet passage 7 from the casing.

Casing 1 receives the filtering unit per se designated generally at 8, the lower header 9 thereof seating on the bottom 2 of the casing. Header 9 is in the form of a circular disc having a depending portion 10 received in a recess 11, the periphery of portion 10 abutting a shoulder 12 formed by the recess 11 to restrain lateral movement of the header 9 within the casing.

A second header 13, also circular in form, is positioned slightly below the cover 3 to form the manifolding chamber 14. Preferably, header 13 is provided with an outwardly opening peripheral groove 15 for receiving the sealing ring 16, which seals off the manifolding chamber 14 from the fluid receiving chamber 17.

The lower and upper headers 9 and 13 are spaced apart solely by the plurality of tubes 18, where constitute the filtering material of the unit. As shown, these tubes all extend parallel to each other and are arranged with respect to the headers 9 and 13 in substantially the same manner as a multi-tube heat exchanger. At their lower ends, the tubes are closed by header 9 and suitably secured thereto as by brazing, or in any other suitable or preferred manner. The upper header seats on projections 19 formed onto the tubes and the upper ends of the tubes pass through the header disc 20 and are spun thereover or brazed thereto.

The filter tubes 18 are all of the same construction, the specific details thereof being set out in the application of Harry L. Wheeler, Jr., Serial No. 335,670, filed Feb. 9, 1953, now abandoned. They are constructed from wire wound porous metal made by wrapping a very thin and narrow ribbon of flattened wire around a mandrel of circular cross section, such as a cylinder or cone. This ribbon may be composed of any sinterable material which may be drawn into wire such as, for example, all types of steels, super alloys, molybdenum and titanium. After the wire has been wound on the mandrel to the desired depth, both mandrel and wire as a unit are placed in a controlled atmosphere furnace and sintered. The sintering temperature will generally be in the order of 90% of the absolute melting temperature of the wire, but may be varied depending on the energy characteristics of the metal employed. Following sintering, the mandrel is removed and the metallic shape processed into a finished form. The porosity is formed by the spaces between the individual strands of wire, and with proper control the pores will be interconnected, of predetermined size, uniformly distributed, and will form a predetermined passage for the fluid to flow through the metal. In other words, the nature of the porosity is established by the positioning of a single strand of wire, and since this strand is positioned mechanically, the resulting product is as uniform in structure as the fabricating machinery will permit.

Pore spacing and size are basically determined by the gap left between wires during winding. In general the larger the gap, the more porous the structure. Other controls which may be exercised over the porosity and its orientation concern the production of tapered pores and pores which slope with reference to the cylindrical axis.

The wire is wound in a helical path and unless the pitch angle of this path is 45° wound wire, porous metal will, like wood, be a non-isotropic material having greatest strength in the direction of the bisector of the acute crossing angle, and the lowest strength at right angles to this direction. The most nearly isotropic condition will result when the crossing angle is 90° while extremely high unidirectional strength may be achieved by employing a very low pitch angle. The sintering process used with wire is quite similar to that employed to sinter metal powders. The term sinter, as defined by Goetzel, is used to cover the bonding of metals at high temperature both in the presence and absence of a liquid phase. Thus, for high temperature application, metals are sintered without a liquid phase, while for lower temperature applications wire coated with copper, silver, tin or low melting point alloys can be fused at lower temperatures with very satisfactory results. The strength of any sintered material will depend on the area and the nature of the contact of the component elements prior to sintering. In general, it is desirable to obtain a large contact area and a substantial contact pressure. Hence, to obtain the largest possible surface area in the absence of compacting pressure, a ribbon is used rather than a round wire.

After sintering, the cylinder is removed from the mandrel. The mandrel, or base form on which the wire is wound, is most commonly ceramic coated steel. The former may be broken in order to separate it from the porous material after sintering. The steel mandrel may be either tapered or collapsible to facilitate withdrawal, but since the winding is very tightly wrapped about the mandrel, the winding must first be slightly expanded.

This expansion is accomplished by tire rolling or swaging the ensemble. This same swaging or rolling operation compacts the porous metal to greater density and, if followed by a re-sinter, will result in much improved physical properties. The size of cylinder which may be wound appears to be limited only by the size of the machine on which it is formed.

The filter tubes of the filtering unit above described may be said to be in tension since the pressure drop across the filter media will be applied in opposite directions to the upper and lower headers. Flow of fluid through the filter is through medium of inlet passageway 5 into chamber 17. Thence, through the pores of the porous filter tubes 18 into the tubes and, such tubes being closed at the bottom, up the inside of tubes 18 to chamber 14 and out through outlet passageway 7.

In the modified form of device shown in Figure 2 of the drawings, casing 21 is provided with a head 22 screw threaded thereto, the head having an inlet passage 23 opening into the casing 21. The head 22 is also provided with an outlet passage 24 leading from the filtering unit.

The filtering unit per se also comprises a plurality of filter tubes 25 formed from the same material and in the same manner as the tubes 18 of Figure 1. The arrangement of the tubes with respect to each other is the same as that previously described. The lower and upper headers 26 and 27, respectively, are simply circular plates having suitable openings therein for reception of the tubes 25. The tubes pass through such openings in headers 26 and 27 and at their lower ends are spun over or brazed to the under surface of lower header 26, and at their upper end are spun over or brazed to the upper surface of upper header 27. It is to be noted that these tubes are opened at both ends.

The headers 26 and 27 are spaced apart by a porous annular filter ring or cylinder 28 formed from the same material and in the same manner as described in connection with the filter tubes 18 of Figure 1. As shown, the cylinder 28 encircles the tubes 25 and is closed at its opposite ends by the headers 26 and 27, thus forming a closed chamber 29 in casing 21. A peripheral flange on the headers 26 and 27, may, if desired, be brazed or otherwise suitably secured to cylinder 28. In such construction, the ring 28 is in compression, while the tubes 25 are in tension. The unfiltered fluid enters the casing 21 through the medium of passageway 23, whence a portion of the fluid passes through the porous annular ring 28 into the chamber 29, while a portion of the fluid enters the upper and lower ends of the porous filter tubes 25 and passes through the pores therein into chamber 29 from whence the filtered fluid passes out of the filter through the medium of outlet passage 24. The flow of fluid through porous cylinder and the porous filter tubes is in parallel.

The further modified form of device shown in Figure 3 conforms in all respects to the construction of the device of Figure 2, except that in lieu of the porous annular cylinder 28, a plurality of layers of wire cloth 30 spaces the headers 26 and 27 apart. In this form of device, the cloth layers are in compression and the porous filter tubes in tension. The flow of fuel through the filter is in the same manner as that described in connection with the device of Figure 2.

While preferred embodiments of the invention have been illustrated and described by way of example, it will be obvious that changes may be made therein within the spirit and scope of the invention and, therefore, the invention is not to be limited to the precise forms herein disclosed, except insofar as it may be so limited by the appended claims.

I claim:

1. For use in a casing having an inlet and an outlet, an integrally removable filtering unit of the class described comprising a plurality of porous filtering tubes located between the inlet and outlet, said tubes being formed from a thin narrow ribbon of sinterable material, and a pair of headers securely fastened only to and held in spaced apart relationship solely by said filtering tubes.

2. For use in a casing having an inlet and an outlet, an integrally removable filtering unit of the class described comprising a plurality of porous filtering tubes located between the inlet and outlet, said tubes being fashioned from sinterable material capable independently of other extraneous means of sustaining structural loads, and a pair of headers secured only to and held in spaced apart relationship solely by said filtering tubes.

3. For use in a casing having an inlet and an outlet, an integrally removable filtering unit of the class described comprising a plurality of porous filtering tubes located between the inlet and outlet, said tubes being formed of a metallic sinterable material, and a pair of headers attached only to and held in spaced apart relationship solely by said filtering tubes.

4. For use in a casing having an inlet and an outlet, an integrally removable filtering unit of the class described comprising a plurality of porous filtering tubes located between the inlet and outlet and formed of a metallic sinterable material, said tubes each being closed at one end and open at the other end, and a pair of headers securely fastened only to and supported in spaced apart relationship solely by said filtering tubes.

5. For use with a casing having an inlet and an outlet, and integrally filtering unit comprising a plurality of porous filtering tubes formed of a metallic sinterable material, and a pair of headers secured only to and structurally supported in spaced apart relationship solely by said filtering tubes, one of said headers isolating said inlet from said outlet.

6. For use in a casing having an inlet and an outlet, an integrally removable filtering unit of the class described comprising a plurality of porous filtering tubes located between the inlet and outlet, said tubes being formed of a metallic sinterable material, lateral projections formed on said tubes near one end thereof, a first header having a plurality of openings formed therein for receiving said one end of said tubes, said first header being seatable on said projections and fixedly secured only to said one end of said tubes, and a second header securely fixed only to the other end of said tubes, said second header closing said other end of said tubes and being spaced from said first header solely by said tubes.

7. For use in a casing having an inlet and an outlet, an integrally removable filtering unit of the class described comprising a plurality of porous filtering tubes and an annular ring located between the inlet and outlet, said tubes and ring being formed of a metallic sinterable material, and a pair of headers attached only to and held in spaced apart relationship solely by said filtering tubes and said annular ring.

8. For use in a casing having an inlet and an outlet, an integrally removable filtering unit of the class described comprising a plurality of porous filtering tubes and an annular ring located between the inlet and outlet, said tubes and ring being formed of a sinterable material, and a pair of headers attached only to and held in spaced apart relationship solely by said filtering tubes and said annular ring, said tubes being in a state of tension and said ring being in a state of compression.

9. For use in a casing having an inlet and an outlet, an integrally removable filtering unit of the class described located between the inlet and outlet comprising a pair of headers, a filtering medium positioned between said headers and forming a chamber therewith, and a plurality of porous filtering tubes formed of a metallic sinterable material having the opposite ends thereof opening through said headers, said headers being attached only to and held in spaced apart relationship solely by said filtering tubes and said filtering medium, the flow of fluid through said filtering medium and said tubes to said chamber being in parallel.

10. For use in a casing having an inlet and an outlet, an integrally removable filtering unit of the class described located between the inlet and outlet comprising a pair of headers, an annular ring formed of a metallic sinterable material positioned between said headers and forming a chamber therewith, and a plurality of porous filtering tubes formed of a metallic sinterable material having the opposite ends thereof opening through said headers, said headers being attached only to and held in spaced apart relationship solely by said filtering tubes and said annular ring, the flow of fluid through said ring and tubes to said chamber being in parallel.

11. For use in a casing having an inlet and an outlet, an integrally removable filtering unit of the class described located between the inlet and outlet comprising a pair of headers, a plurality of layers of wire cloth positioned between said headers and forming a chamber therewith, and a plurality of porous filtering tubes formed of a metallic sinterable material having the opposite ends thereof opening through said headers, said headers being attached only to and held in spaced apart relationship solely by said filtering tubes and said layers of wire cloth, the flow of fluid through said layers of wire cloth and tubes to said chamber being in parallel.

12. For use in a casing having an inlet and an outlet, an integrally removable filtering unit of the class described comprising a plurality of porous filtering tubes located between the inlet and outlet, said tubes being fashioned from sinterable material capable independently of other extraneous means of sustaining structural loads and being arranged so that one of said tubes surrounds the remaining of said tubes, and a pair of headers secured only to and held in spaced apart relationship solely by said filtering tubes.

References Cited in the file of this patent
UNITED STATES PATENTS

| | | |
|---|---|---|
| 512,931 | Aims | Jan. 16, 1894 |
| 654,592 | Barr | July 31, 1900 |
| 2,220,641 | Davis | Nov. 5, 1940 |
| 2,271,662 | Rubissow | Feb. 3, 1942 |
| 2,327,805 | Koehring | Aug. 24, 1943 |
| 2,562,730 | Miller | July 31, 1951 |
| 2,720,278 | Wiley | Oct. 11, 1955 |
| 2,754,005 | Tursky | July 10, 1956 |
| 2,767,851 | Muller | Oct. 23, 1956 |

UNITED STATES PATENT OFFICE

CERTIFICATE OF CORRECTION

Patent No. 2,925,913                        February 23, 1960

Harry L. Wheeler, Jr.

It is hereby certified that error appears in the printed specification of the above numbered patent requiring correction and that the said Letters Patent should read as corrected below.

Column 1, line 34, for "procelain" read -- porcelain --; column 2, line 61, for "where" read -- which --; column 5, lin 20, after "integrally" insert -- removable --.

Signed and sealed this 4th day of October 1960.

(SEAL)

Attest:

KARL H. AXLINE

Attesting Officer

ROBERT C. WATSON

Commissioner of Patent